(12) United States Patent
Niedzwiecki et al.

(10) Patent No.: US 9,814,071 B2
(45) Date of Patent: Nov. 7, 2017

(54) MEDIA ACCESS CONTROL PROTOCOL FOR MULTIUSER DETECTION ENABLED AD-HOC WIRELESS COMMUNICATIONS

(75) Inventors: Joshua D. Niedzwiecki, Manchester, NH (US); Brandon P. Hombs, Merrimack, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 2309 days.

(21) Appl. No.: 12/742,686

(22) PCT Filed: Sep. 25, 2009

(86) PCT No.: PCT/US2009/058409
§ 371 (c)(1),
(2), (4) Date: May 13, 2010

(87) PCT Pub. No.: WO2010/062456
PCT Pub. Date: Jun. 3, 2010

(65) Prior Publication Data
US 2011/0051674 A1    Mar. 3, 2011

Related U.S. Application Data

(60) Provisional application No. 61/100,461, filed on Sep. 26, 2008.

(51) Int. Cl.
*H04J 1/00*     (2006.01)
*H04W 74/08*    (2009.01)
(Continued)

(52) U.S. Cl.
CPC ...... *H04W 74/0833* (2013.01); *H04B 1/7105* (2013.01); *H04L 27/0006* (2013.01); *H04W 74/002* (2013.01)

(58) Field of Classification Search
USPC ................................. 370/310–350
See application file for complete search history.

(56) References Cited

U.S. PATENT DOCUMENTS 6,947,502 B2    9/2005    Taylor et al.
7,245,673 B2    7/2007    MacLeod
(Continued)

FOREIGN PATENT DOCUMENTS

JP    2000-252918 A    9/2000
WO    2000-71843 A2   11/2000

OTHER PUBLICATIONS

U.S. Non-Final Office Action dated Jan. 17, 2013 for related U.S. Appl. No. 13/090,435, filed Apr. 20, 2011, references cited herein.
(Continued)

*Primary Examiner* — Andrew Chriss
*Assistant Examiner* — Kenan Cehic

(57) ABSTRACT

A method is disclosed for increasing the communication capacity of a shared ad-hoc wireless channel by using multiuser detection (MUD) to distinguish overlapping information transmitted simultaneously by a plurality of nodes. The transmitting nodes simultaneously provide parameter-estimating signals over separate, unshared, low-rate parameter channels generated using orthogonal frequencies, spread spectrum technology, or time multiplexing. Receiving nodes use these separate, non-overlapping parameter-estimating signals to estimate MUD-required signal parameters such as amplitude, phase, and frequency offset, thereby enabling use of lower complexity MUD receivers, because the parameters are not estimated in the presence of other interference. Node ID, spreading code type, and/or other information can also be transmitted over the parameter channels. Limiting the number of parameter channels can limit the maximum number of transmitting nodes. Amplitudes of parameter channel transmissions can be greater than communication channel transmissions by a known ratio. Parameter channels can be frequency-hopped for jam-resistance.

21 Claims, 8 Drawing Sheets

(51) Int. Cl.
*H04B 1/7105* (2011.01)
*H04L 27/00* (2006.01)
*H04W 74/00* (2009.01)

(56) References Cited

U.S. PATENT DOCUMENTS

| | | | | |
|---|---|---|---|---|
| 2002/0070845 | A1 | 6/2002 | Reisinger et al. | |
| 2006/0114826 | A1* | 6/2006 | Brommer | 370/230 |
| 2006/0140259 | A1* | 6/2006 | Dunyak et al. | 375/148 |
| 2006/0215611 | A1 | 9/2006 | Nakagawa et al. | |
| 2007/0087756 | A1* | 4/2007 | Hoffberg | 455/450 |
| 2008/0095121 | A1 | 4/2008 | Shattil | |
| 2011/0051674 | A1 | 3/2011 | Niedzwiecki et al. | |

OTHER PUBLICATIONS

PCT Search Report dated Apr. 23, 2010 of PCT Application No. PCT/US2009/058409 filed Sep. 25, 2009, 9 pages.

So, Jungmin et al., A Multi-Channel MAC Protocol for Ad Hoc Wireless Networks, Technical Report Jan. 2003 University of Illinois at Urbana-Champaign, 14 pages.

Wu, Shih-Lin et al., A New Multi-Channel MAC Protocol With On-Demand Channel Assignment for Multi-Hop Mobile Ad Hoc Networks, 2000, pp. 232-237, IEEE 1087-4089/00.

Chen, Huimin et al., A New Multi-Channel MAC Protocol With Power Control for Ad Hoc Networks, 2006, 4 pages, IEEE Proceedings of the 20th International Conference on Advanced Information Networking and Applications (AINA'06).

Jin, Kyu-Tae, Multi-Code MAC for Multi-Hop Wireless Ad Hoc Networks, 2002, pp. 1100-1104, IEEE 0/7803-7467-3/02.

JP Office Action dated Nov. 29, 2011 against JP Patent Application No. 2009-098246; translation by Meisei International Patent Firm.

EP Office Action dated Jan. 18, 2011 against (related) EP Patent Application No. 038176798; BAE Systems Information and Electronic Systems Integrations, Inc. (Applicant).

Baines, S.J. et al., "Double window multi-user detection for asynchronous DS-CDMA", IEEE 1996, Electronic Letters, Nov. 21, 1996, vol. 32, No. 24, pp. 2199-2201.

Damnjanovic, A. et al., "Iterative Multiuser Detection/Decoding for Turbo Coded CDMA Systems", IEEE Communications Letters, vol. 5, No. 3, Mar. 2001, pp. 104-106.

Wang, X. et al., "An Overlapping Window Decorrelating Multiuser Detector for DS-CDMA Radio Channels", IEEE Transactions on Communications, vol. 49, No. 8, Aug. 2001, pp. 1488-1495.

\* cited by examiner

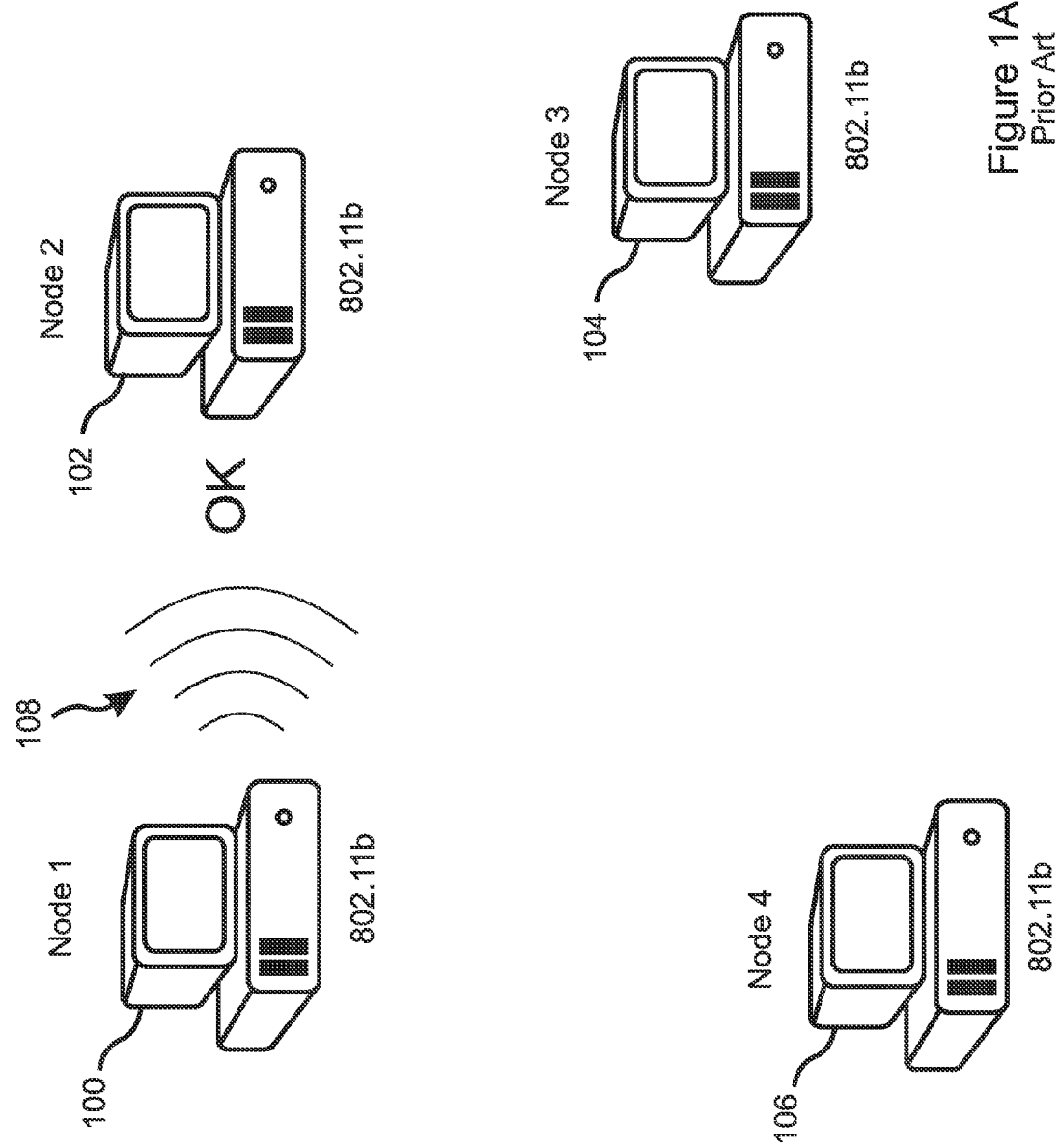

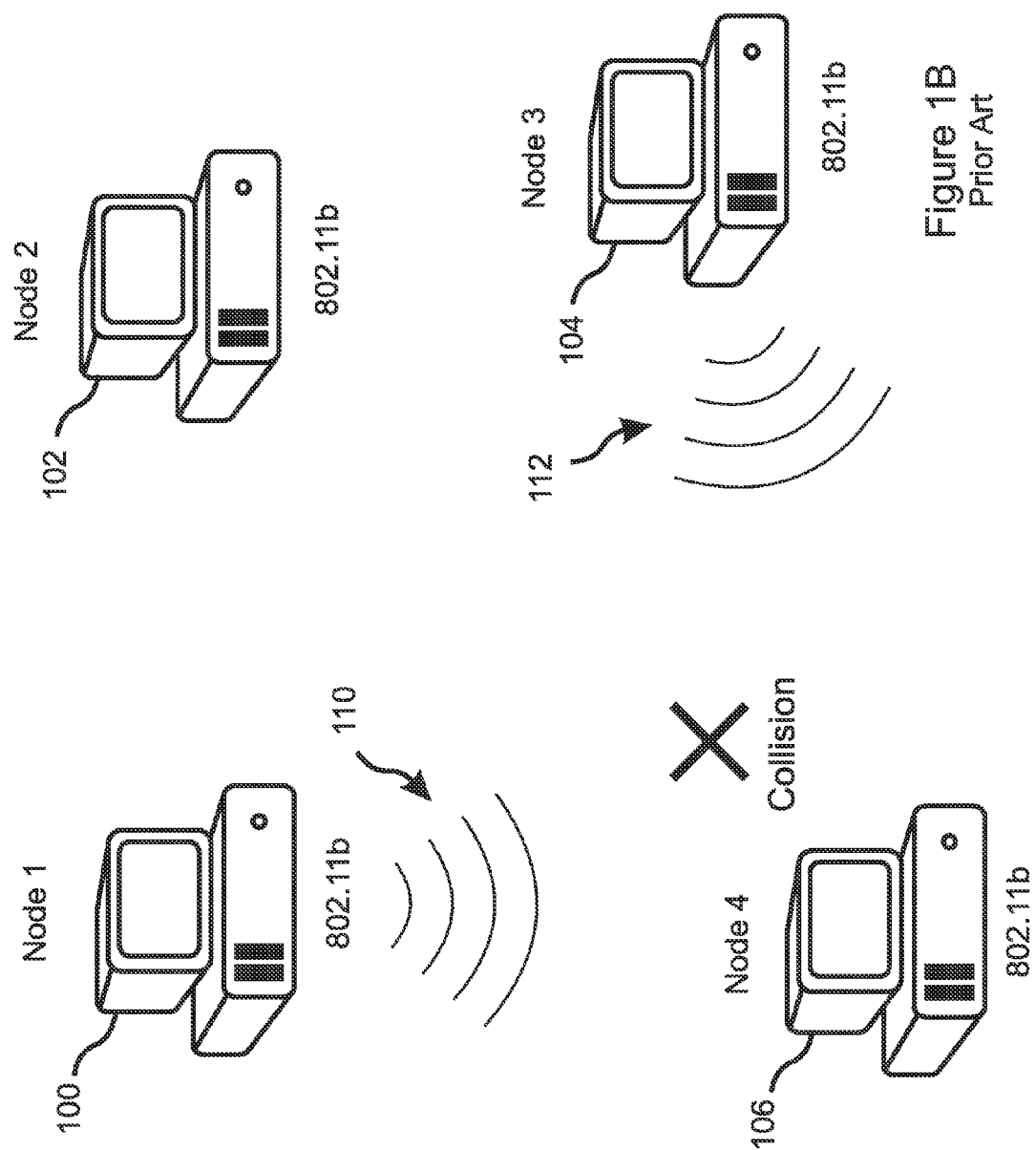

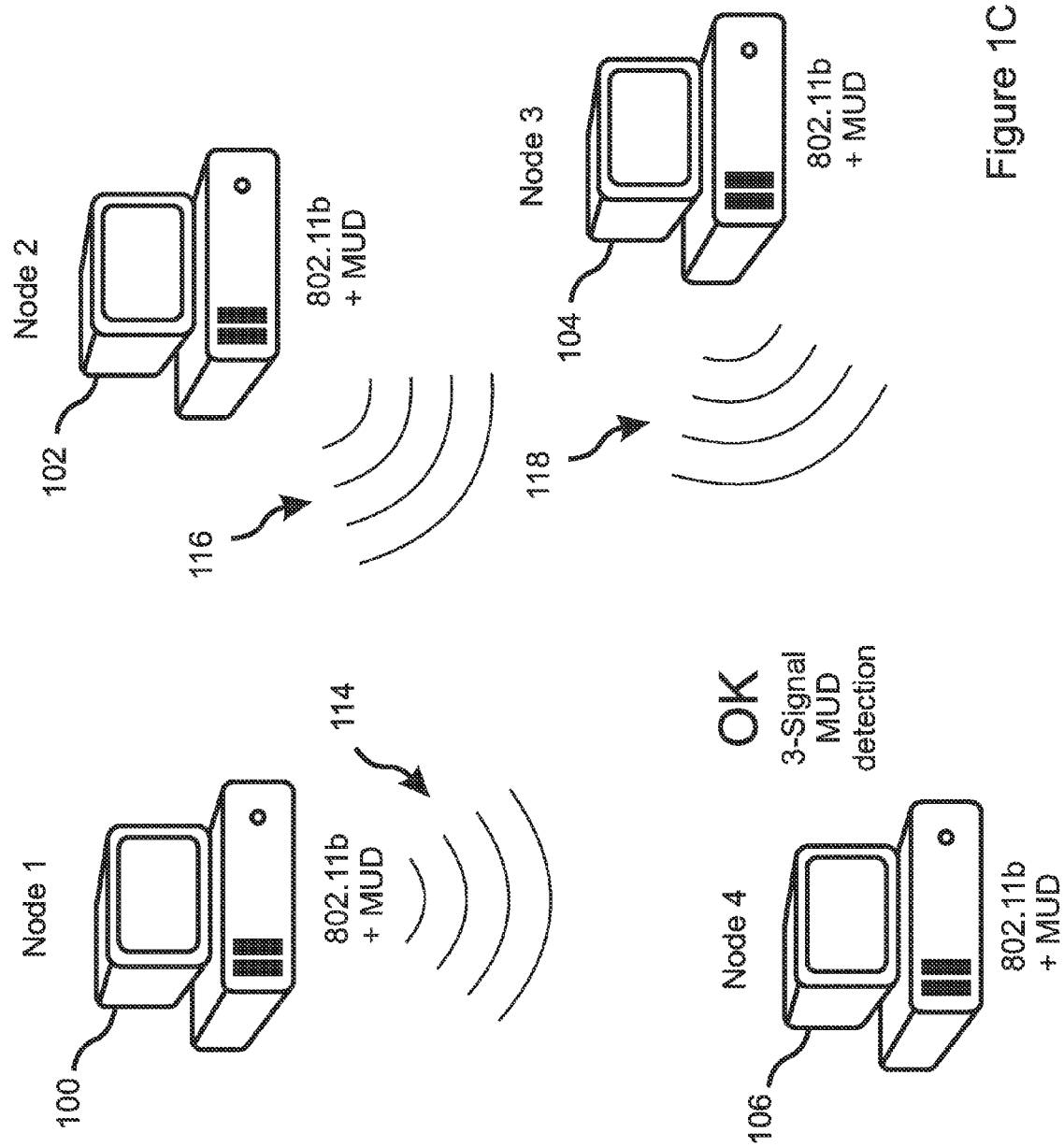

MEDIA ACCESS CONTROL PROTOCOL FOR MULTIUSER DETECTION ENABLED AD-HOC WIRELESS COMMUNICATIONS

RELATED APPLICATIONS

This application claims the benefit of U.S. Provisional Applications No. 61/100,461, filed Sep. 26, 2008, which is herein incorporated by reference in its entirety for all purposes.

STATEMENT OF GOVERNMENT INTEREST

This invention was made with United States Government support under Contract No. HROO11-05-C-0064 awarded by the Defense Advanced Research Projects Agency (DARPA). The United States Government has certain rights in this invention.

FIELD OF THE INVENTION

The invention relates to digital communication systems, and more particularly to ad hoc wireless multiuser digital communication systems.

BACKGROUND OF THE INVENTION

In digital communications, it is often desirable for a plurality of users, or "nodes" to communicate over a shared, multiuser network, rather than relying on point-to-point communication. While point-to-point communication offers the advantage of guaranteed, dedicated access to a communication medium, and consequent high communication speeds, implementation costs for a point-to-point communication system can be prohibitively high, scalability is typically difficult, and configuration can be burdensome.

Shared, multiuser networks allow a plurality of users, or "nodes," to share a common communication medium, thereby reducing costs and enhancing scalability and ease of configuration. Of course, a significant disadvantage of shared medium networks as compared to point-to-point networks is that they are much more limited in traffic capacity, due to the requirement that only one node transmit information on the shared communication medium at any given time. If more than one node attempts to transmit at the same time, a so-called "collision" occurs, whereby the transmitted information is unintelligible, and must be re-transmitted.

Shared networks are typically either "managed" or "ad hoc." In a managed network, a central controller or "access point" manages use of the shared communication medium, thereby minimizing collisions and managing recovery from any collisions that do occur. In an "ad hoc" network, all nodes are treated equally, and must negotiate directly with each other so as to coordinate use of the shared communication medium, avoid collisions, and recover from collisions. Typical examples of ad hoc digital networks include Ethernet networks and wireless "802.11b" networks.

The decentralized nature of ad hoc networks makes them suitable for a variety of applications. They are naturally robust, since no single node is vital to the network, and they are easy to scale, since configuration requirements are typically minimal, and deployment is usually quick and automatic.

However, due to the lack of a central controller, ad hoc networks must use special protocols so as to avoid and recover from collisions. One commonly used protocol is the Carrier Sense Multiple Access protocol, or CSMA. In this approach, each node monitors the network so as to sense if any communication traffic is present. A node only attempts to transmit information when no traffic is detected. Collision avoidance can be further enhanced in wired networks by using a CSMA/CD protocol, which adds "Collision Detection" to the basic CSMA protocol. In CSMA/CD, a transmitting node monitors the network while it is transmitting, halts transmission if a packet collision is detected, and then repeats the attempt at a later time.

However, it is typically not possible for collision detection to be used in a wireless network, since it is generally not possible for a wireless node to monitor the network while it is transmitting. Hence, it is not generally possible for a wireless node to directly detect collisions during transmission, making it impossible for a wireless network to use collision detection protocols such as CSMA/CD. Also, due to distances and intervening structures, it may not be possible for a specific node in a wireless network to detect signals from all other wireless nodes on the network. The likelihood of inadvertent collisions in wireless ad hoc networks is therefore much greater than for wired networks.

So as to enhance avoidance of collisions on a wireless ad hoc network, a "Collision Avoidance" protocol such as CSMA/CA can be used. In the CSMA/CA approach, after determining that no traffic appears to be present on the network, a transmitting node first sends a signal to all other nodes instructing them not to transmit, and then transmits its packet of information. CSMA/CA can be further enhanced by the exchange of a Request to Send (RTS) packet sent by the sender, and a Clear to Send (CTS) packet sent in reply by the intended receiver. These packets serve to alert all nodes within range of the sender, the receiver, or both, to keep quiet for the duration of the main packet. This is known as the IEEE 802.11 RTS/CTS exchange.

As mentioned above, a significant disadvantage of shared medium networks as compared to point-to-point networks is that shared networks are much more limited in traffic capacity, due to the requirement that only one node transmit information on the shared communication medium at any given time. This requirement can be relaxed somewhat by using one or more so-called "spread-spectrum" technologies to "spread" the shared communications medium into a plurality of separately usable communications channels.

For example, Frequency Division Multiple Access, or FDMA technology, provides for transmissions to occur in different frequency bands on the shared communications medium. Filters are then used to isolate the transmissions on the separate frequency channels, allowing for simultaneous information transmission on each of the frequency-separated channels. Of course, FDMA requires an increased communication bandwidth, and so is limited in wireless applications according to bandwidth allocations.

Time Division Multiple Access, or TDMA, divides time into available channel "slots." Nodes transmit in rapid succession, one after the other, in a repeating cycle, each node using its own time slot. This approach accelerates communication rates by minimizing the overhead required by negotiation protocols such as CSMA.

Code Division Multiple Access, or CDMA, allows a limited degree of shared use of a communications channel, wherein different nodes transmit using different encoding schemes that can be distinguished from each other by the receiving nodes.

Specifically in the case of wireless networks, Spatial Division Multiple Access, or SDMA, can also be used. One example of SDMA is the division of a geographic region into communication "cells" in a typical cellular telephone network.

Depending on the circumstances, some or all of the above spread-spectrum technologies can be combined so as to yield a further increase in communication speed. In general, however, even when spread-spectrum technologies are employed, the communication speed of a shared ad hoc wireless network is still significantly limited due to the requirement that only one node transmit over a single communication channel at any given time, and due to the added overhead of the various protocols that are used to avoid and/or recover from packet collisions.

SUMMARY OF THE INVENTION

A method is claimed that employs multiuser detection (MUD) technology so as to allow a plurality of nodes to transmit simultaneously over a shared communication channel in a wireless ad hoc digital network. The communication capacity of the wireless ad hoc network is thereby increased by up to an order of magnitude or more.

The details of various multiuser detection analysis methods are presented in references cited below, and are incorporated herein by reference. Fundamentally, MUD technology distinguishes, or "demodulates," overlapping digital signals by capitalizing on differences in certain signal parameters, including analog signal parameters, that are applicable to the digital signals, such as, but not limited to, relative time delay, signal amplitude, and signal phase. In a wireless network, all of these parameters will be affected by the relative distances between nodes, as well as by the presence of any intervening buildings or other structures or environmental anomalies that affect, attenuate, and/or reflect the signals. Multiple interfering signals can be distinguished using MUD technology, so long as the signal parameters for each of the overlapping signals are known, or can be accurately estimated.

In the present invention, each node on the shared wireless network is equipped with a MUD detector, and a plurality of nodes is allowed to transmit packets simultaneously on the same communication channel. Each transmitting node simultaneously transmits a set of parameter-estimating symbol patterns to the receiving nodes using an unshared, dedicated, low-collision or collision-free parameter channel, such as may be created using frequency division multiple access (FDMA) or time division multiple access (TDMA) technology. The parameter-estimating symbol patterns allow the receiving nodes to easily and accurately estimate MUD-relevant parameters for each of the transmitting nodes, where typical MUD-relevant parameters may include amplitude, phase, relative carrier frequency offset, and rough time delay. Bandwidth can be conserved by using relatively low data-rate parameter channels, since a high rate of data transmission is not required for the parameter-estimating symbol patterns. In some embodiments, each transmitting node also transmits other information on the unshared dedicated parameter channel, such as identifying information (node "ID") and spreading code type.

In some embodiments, the total number of parameter channels, or "slots," corresponds to the maximum number of nodes that are allowed to transmit simultaneously on the main communication channel. In these embodiments, when a node wishes to transmit a packet, it first seeks an unoccupied parameter slot. Once an unoccupied slot is found, the node transmits its parameter-estimating symbol patterns at a low rate on the available parameter slot while simultaneously transmitting its packet at a high rate on the main communication channel.

By providing only a limited number of parameter slots, this approach serves to limit and control the number of nodes that can attempt to simultaneously transmit packets on the main communication channel, thereby preventing overburdening of the communication channel. No other network traffic detection is required, nor is any effort made to avoid collisions on the main communication channel. In fact, it is assumed that, in general, other nodes will be transmitting their packets simultaneously, and the MUD-equipped receiving nodes will be able to use the signal parameters estimated using the separately transmitted parameter-estimating symbol patterns to demodulate the packets upon detection.

In various embodiments, spread-spectrum technology is further employed to divide the main communication channel into a plurality of spread communication channels, each of which can be used simultaneously by a plurality of transmitting nodes.

Both the communication channels and the signal parameter channels may be provided using any of the spread-spectrum technologies known in the art, such as TDMA, FDMA, CDMA, or SDMA. In addition to the parameter-estimating symbol patterns, the parameter channels can also be used to transmit other node-specific information, such as carrier offsets, spreading code type(s), and node ID's.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

One general aspect of the present invention is a method for enabling a receiving node to distinguish information simultaneously received from a plurality of transmitting nodes on a shared communication channel of a wireless digital network. The method includes providing a plurality of parameter channels on the network in addition to the shared communication channel, requiring each transmitting node to transmit a parameter-estimating signal on an unshared said parameter channel, detecting the parameter-estimating signals on the unshared parameter channels and estimating therefrom at least one unique signal parameter for each of the transmitting nodes, and detecting and distinguishing the information simultaneously received from each of the transmitting nodes according to their respective said unique estimated signal parameters.

In some embodiments, providing a plurality of parameter channels includes using channel-spreading technology. And in some of these embodiments the channel spreading technology comprises at least one of FDMA, TDMA, CDMA, and SDMA.

In various embodiments, requiring each transmitting node to transmit a parameter-estimating signal includes requiring each transmitting node to transmit the parameter-estimating signal while simultaneously transmitting information on the shared communication channel.

In some embodiments the parameter-estimating signal is a parameter-estimating symbol pattern. In other embodiments the at least one unique signal parameter includes signal amplitude. In yet other embodiments the at least one unique signal parameter includes a signal phase. In still other embodiments the at least one unique signal parameter includes a signal carrier frequency offset. And in still other embodiments the at least one unique signal parameter includes a signal relative time delay.

Various embodiments further include requiring each transmitting node to transmit node identifying information on the unshared parameter channel. And some embodiments further include requiring each transmitting node to transmit spreading code type information on the unshared parameter channel.

Certain embodiments further include requiring each transmitting node to transmit its parameter-estimating signal at an amplitude that is greater than the amplitude at which the transmitting node transmits information on the shared communication channel, the parameter-estimating signal amplitude and the information transmitting amplitude having a predetermined ratio.

In some embodiments the parameter channels are randomly shifted over time between a plurality of wireless frequencies. In other embodiments the parameter channels are shifted according to a random hopping pattern. In still other embodiments the random hopping pattern is based on a GPS clock timebase. And in certain embodiments the parameter channels are low in communication rate compared to the shared communication channel.

Another general aspect of the present invention is a method for enabling a receiving node to distinguish information simultaneously received from a plurality of transmitting nodes on a shared communication channel of a wireless ad-hoc digital network. The method includes using channel-spreading technology to provide a plurality of parameter channels on the network in addition to the shared communication channel, requiring each transmitting node to transmit a parameter-estimating signal on an unshared said parameter channel while simultaneously transmitting information on the shared communication channel, detecting the parameter-estimating signals on the unshared parameter channels and estimating therefrom at least a signal amplitude and a signal phase for each of the transmitting nodes, and detecting and distinguishing the information simultaneously received from each of the transmitting nodes according to their respective said estimated signal amplitudes and signal phases.

Some embodiments further include requiring each transmitting node to transmit node identifying information on the unshared parameter channel.

Yet another general aspect of the present invention is a method for enabling a receiving node to distinguish a plurality of data packets simultaneously received from a plurality of transmitting nodes on a shared communication channel of a wireless ad-hoc digital network. The method includes using FDMA channel-spreading technology to divide the shared communication channel into a primary data communication channel and a plurality of parameter channels, the parameter channels being offset in carrier frequency from each other and from the primary data communication channel, requiring each transmitting node to transmit a parameter-estimating signal on an unshared said parameter channel while simultaneously transmitting data packets on the shared communication channel, detecting the parameter-estimating signals on the unshared parameter channels and estimating therefrom at least a signal amplitude, a signal phase, and a signal carrier offset frequency for each of the transmitting nodes, and detecting and distinguishing the plurality of data packets simultaneously received from each of the transmitting nodes according to their respective said estimated signal amplitudes and signal phases.

Some embodiments further include requiring each transmitting node to transmit node identifying information on the unshared parameter channel.

BRIEF DESCRIPTION OF THE DRAWINGS

FIG. 1A is a functional diagram illustrating a single packet transmission on a shared, ad hoc, wireless, multiuser digital communication network of the prior art;

FIG. 1B is a functional diagram illustrating a packet collision due to simultaneous transmission by two nodes on the network of FIG. 1A;

FIG. 1C is a functional diagram illustrating successful simultaneous transmission of a plurality of packets on a shared, ad hoc, wireless, multiuser digital communication network using an embodiment of the present invention;

DETAILED DESCRIPTION

Figure 2A:
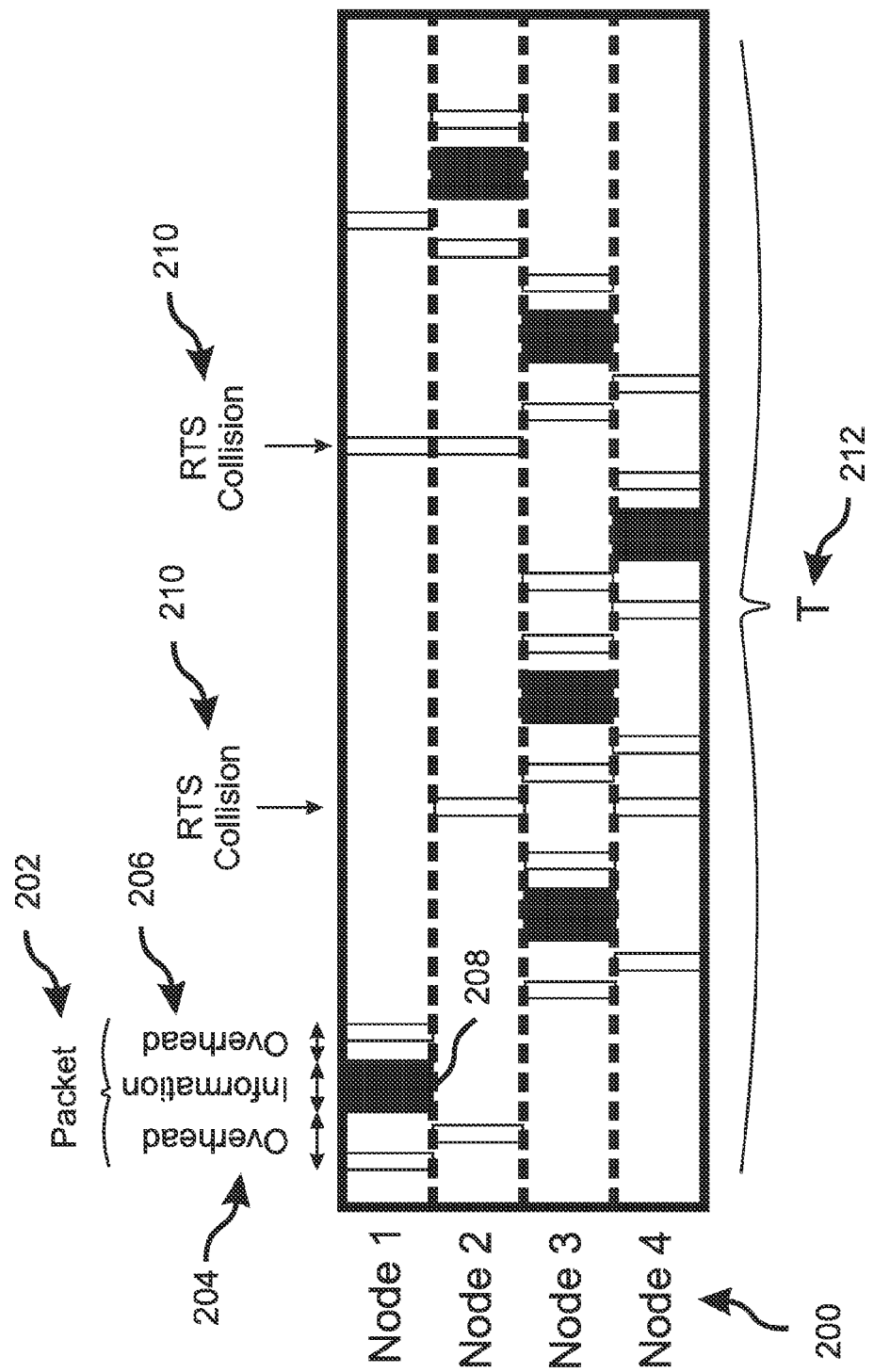
FIG. 2A is a time-flow diagram illustrating use of a prior art collision avoidance protocol to avoid collisions and recover therefrom.

In FIG. 1A, a typical wireless ad hoc communication system of the prior art is illustrated, wherein four "nodes" 100, 102, 104, 106 are in communication through a wireless 802.11b network. For simplicity, the nodes are depicted as desktop computers in FIG. 1A, but it is understood that each node can represent any network compatible device, such as a laptop computer, a mobile phone, a PDA, and such like. FIG. 1A specifically illustrates a packet 108 being sent by one of the nodes 100 to another node 102. No other communication is attempted on the network during transmission of the packet 108, and the packet 108 is received successfully by the second node 102. However, the communication rate is slow, because the other nodes 104, 106 must refrain from transmitting until the packet 108 transmitted by the first node 100 is received by the second node 102.

FIG. 1B illustrates the network of FIG. 1A, wherein two of the nodes 100, 104 have attempted to transmit packets 110, 112 simultaneously to a third node 106. A "collision" has occurred whereby the third node 106 is unable to make any use of the two transmitted packets, since they overlap and cannot be distinguished from one another. Retransmission of the packets 110 112 will be needed so as to successfully deliver both packets 110, 112. Similar collisions will occur any time two nodes attempt to simultaneously transmit packets, whether or not the packets are directed to the same receiving node. Even if a collision avoidance protocol is used, such as CSMA/CA, excessive distance and/or an intervening structure between the two transmitting nodes 100, 104 may prevent them from directly detecting each other and avoiding the collision. And even if the 802.11b RTS/CTS packet exchange protocol serves to prevent the collision, significant loss of communication rate will still occur due to the requirement that only one node transmit at a time, and due to the overhead required by the CSMA/CA and RTS/CTS collision avoidance protocols.

In one embodiment of the invention, each node on a shared wireless network is equipped with a MUD detector, and a plurality of nodes is allowed to transmit packets simultaneously on the same communication channel. Any of several MUD solutions can be implemented for this purpose. See for example patent application U.S. Ser. No. 11/035,311 and U.S. Pat. No. 6,999,498, U.S. Pat. No. 6,981,203, U.S. Pat. No. 6,967,598, U.S. Pat. No. 6,947,506, U.S. Pat. No. 6,839,390, U.S. Pat. No. 6,831,574 and U.S. Pat. No. 6,704,376, all of which are incorporated herein by reference for all purposes. MUD technology distinguishes, or "demodulates," overlapping digital signals by capitalizing on differences in certain signal parameters that are applicable to the digital signals, such as, but not limited to, analog signal parameters that may include signal amplitude, signal phase, and relative time delay. In a wireless network, all of these parameters will be affected by the relative distances between nodes, as well as by the presence of any intervening buildings or other structures, or any environmental anomalies that affect, attenuate and/or reflect the signals. Multiple signals can be distinguished using MUD technology, so long as the signal parameters for each of the overlapping signals are known, or can be accurately estimated.

FIG. 1C illustrates another embodiment of the present invention. The illustrated embodiment is similar to the network of FIG. 1A and FIG. 1B, but includes MUD detection implemented on each of the nodes 100, 102, 104, 106. In this embodiment, a spread-spectrum technology (not illustrated) is used to provide at least three separate, low-rate parameter channels. Three of the nodes 100, 102, 104 have each acquired one of these parameter channels, and are transmitting parameter-estimating symbol patterns on the parameter channels while simultaneously transmitting data packets 114, 116, 118 to a fourth node 106. In some embodiments, each transmitting node also transmits other information on the unshared dedicated parameter channel, such as identifying information (node "ID") and spreading code type. Because the parameter channels are dedicated, no collisions occur between the symbol patterns transmitted on them. In some embodiments, the transmit amplitude used for sending information on the parameter channels is higher than the amplitude used for transmitting information on the main communication channel. So long as the receiving nodes know what the relative scale factor is, then signal parameters can still be accurately estimated, and the higher transmit amplitudes will allow for better signal-to-noise ratios and more accurate estimation of the signal parameters. In other embodiments, a random hopping pattern is included in the spread-spectrum technology that moves the parameter channels to different frequencies at predetermined times, which for some embodiments is based on a GPS clock time. The random-hopping pattern causes these embodiments to be resistant to jamming of the parameter channels.

The MUD detector included with the fourth node 106 is able to use the parameter-estimating symbol patterns to accurately estimate the signal parameters for the three transmitting nodes 114, 116, 118, and using the estimated parameters the fourth node 106 is able to demodulate the three packets 114, 116, 118 and receive all of them. Retransmission is not needed, and a high communication rate is achieved.

For simplicity, the nodes are depicted as desktop computers in FIG. 1C, but it is understood that each node can represent any network compatible device, such as a laptop computer, a mobile phone, a PDA, and such like. It is also understood that the simultaneously transmitted packets do not necessarily need to be addressed to a common receiving node, but can be transmitted to any combination of receiving nodes.

FIG. 2A is a time-flow diagram that illustrates the sharing of a common communication medium in a typical prior-art wireless 802.11b communication network. The horizontal bands in the diagram represent the activity of each of four nodes 200 communicating on the network. When a packet 202 is transmitted from node 1 to node 2, considerable overhead is required both before 204 and after 206 transmission of the main packet 208. During all of this time, the other nodes on the network must wait before attempting to transmit information. While the RTS/CTS protocol prevents most collisions between main packets, collisions 208 do occur between the RTS packets. This causes added delay and re-transmission, and leads to a lengthy required time T 212 for transmission of the six illustrated packets.

Figure 2B:
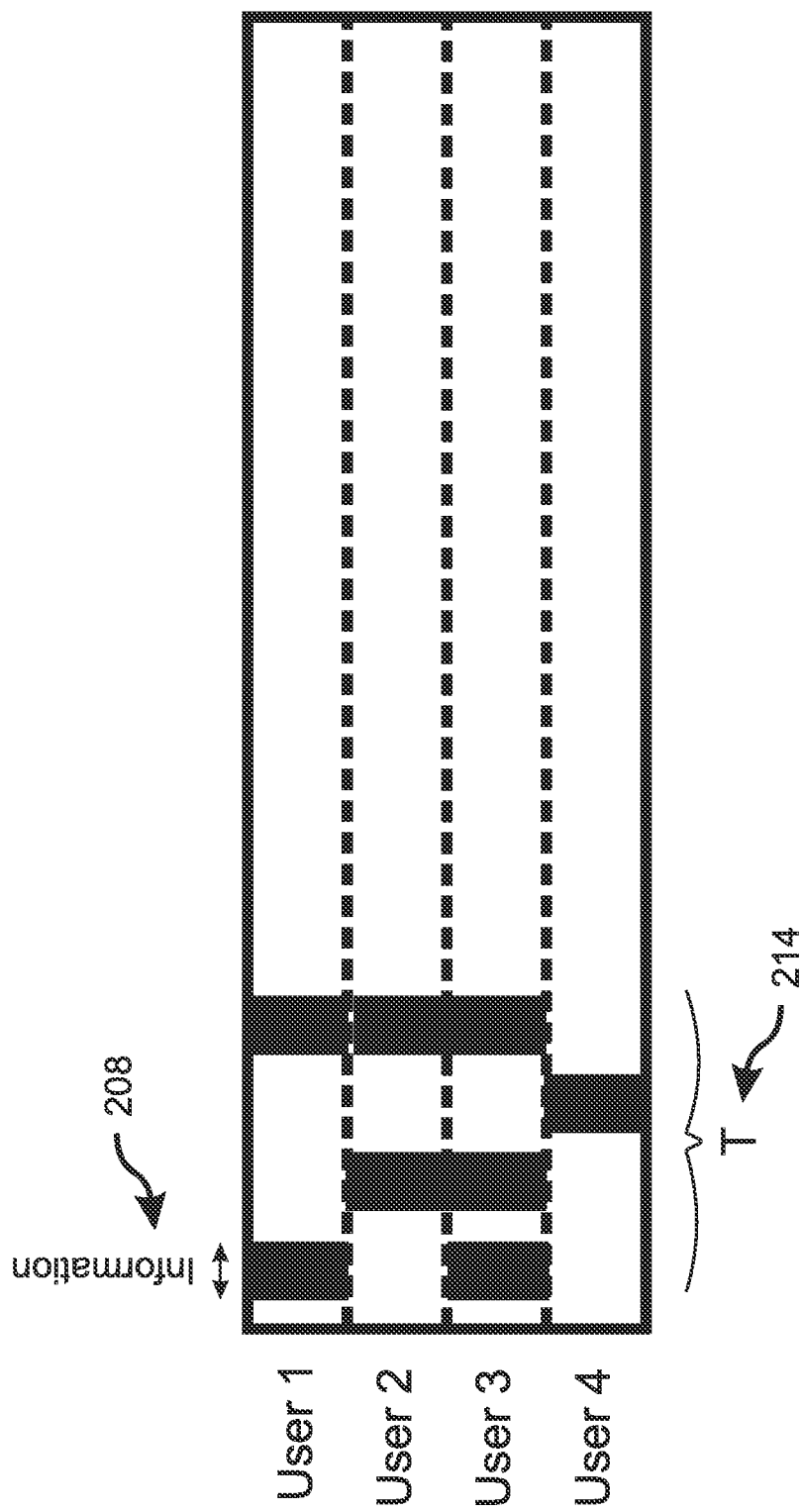
FIG. 2B is a time-flow diagram illustrating simultaneous transmission of packets according to an embodiment of the present invention.

FIG. 2B is a time flow diagram that illustrates the sharing of a common wireless communication medium in an embodiment of the present invention. No collision prevention protocols 204, 206 are required, and information packets 208 can be transmitted simultaneously. The result is that a larger number of data packets (eight are illustrated) can be communicated in a shorter amount of time 214.

Figure 3:
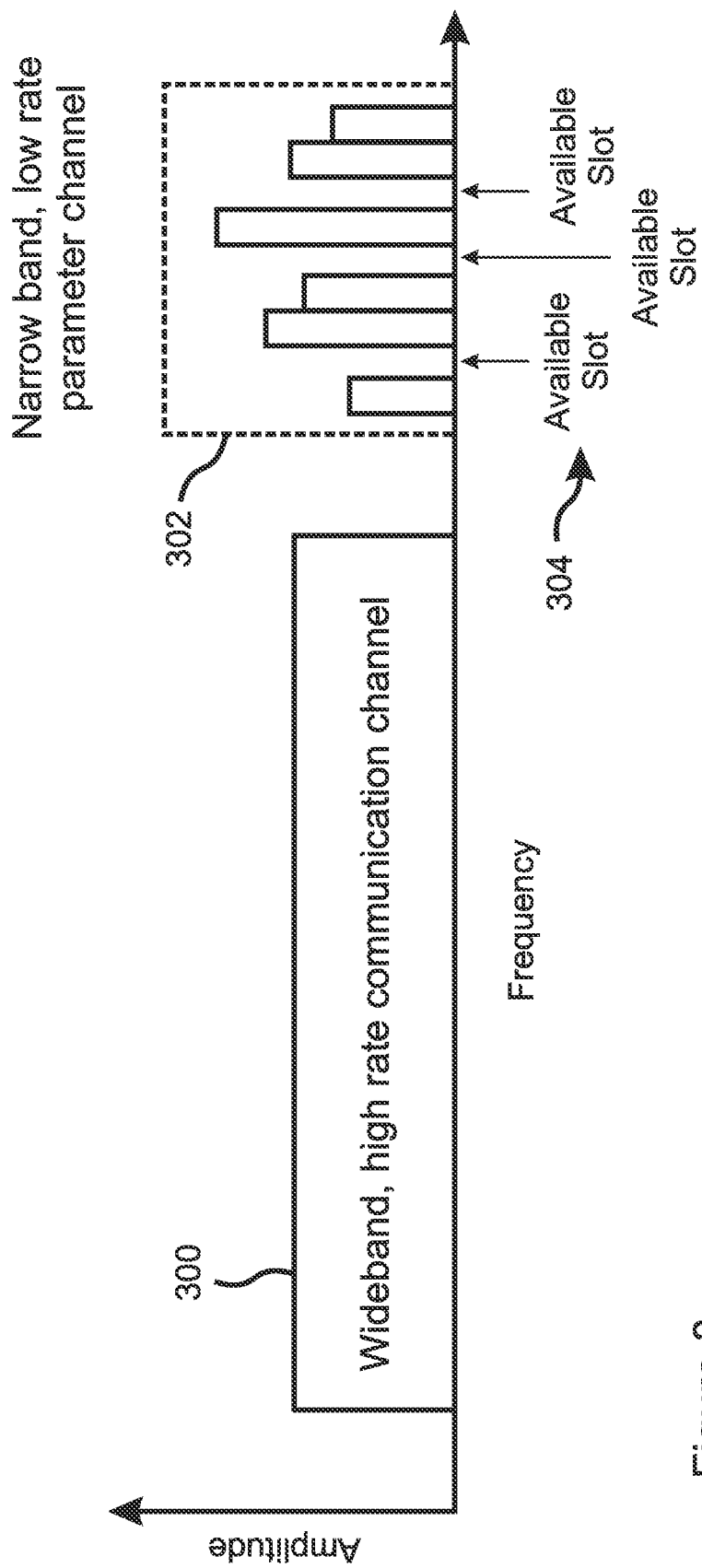
FIG. 3 is a graph illustrating FDMA spreading of a shared communication medium into a main communication channel and a plurality of parameter channels, according to an embodiment of the present invention.

FIG. 3 is a graph illustrating an embodiment in which FDMA spreading is used to spread a shared communication medium into a main communication channel 300 and a plurality of parameter channels 302. The main communication channel 300 is a high rate channel and so requires a wide frequency bandwidth. The plurality of parameter channels 302 or "slots" are clustered together in a narrow range of frequencies 302. In FIG. 3, several of the slots are occupied, and it can be seen that they are generally carrying signals of different amplitudes, corresponding to varying distances to the transmitting nodes, and also to the effects of intervening buildings and other obstacles that attenuate and/or reflect the transmitted signals. Some of the slots are unoccupied, and are available 304 for additional nodes to acquire and use while transmitting. When all of the slots are occupied, no additional nodes can transmit, thus effectively limiting the number of nodes that can transmit simultaneously.

Figure 4:
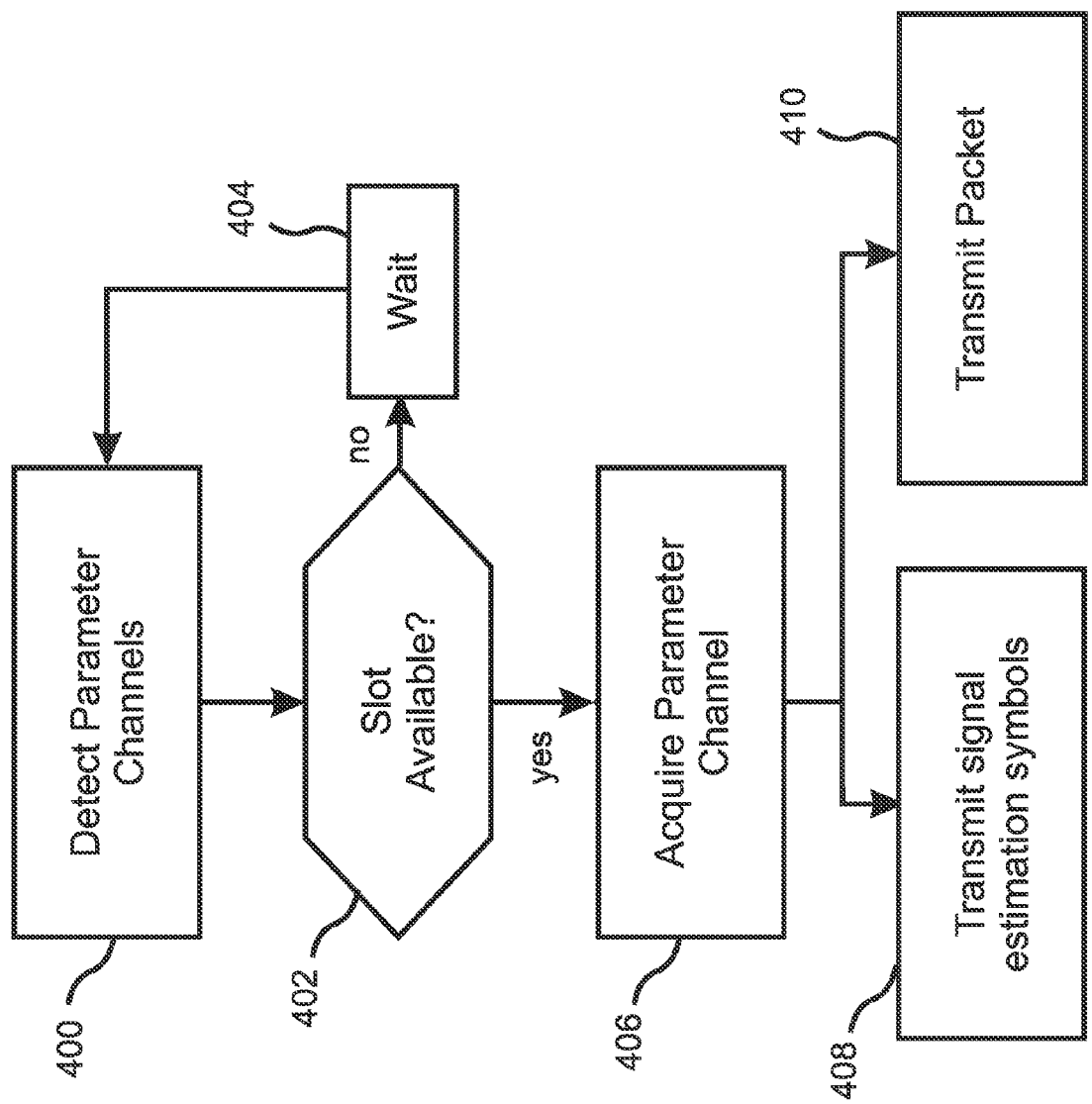
FIG. 4 is a flow diagram illustrating steps followed by a transmitting node in the embodiment of FIG. 3.

FIG. 4 is a flow diagram that illustrates the steps followed by a node that is seeking to transmit a packet on the network of FIG. 3. The node first detects the traffic on the parameter channels 400 to determine if any slots are available 402. If not, then the node waits 404 and continues to monitor the parameter channels 400. If a slot is available, the node acquires one of the available parameter channels 406 and transmits a parameter-estimating symbol pattern 408 on the available signal channel while simultaneously transmitting the packet 410 on the main communication channel.

Figure 5:
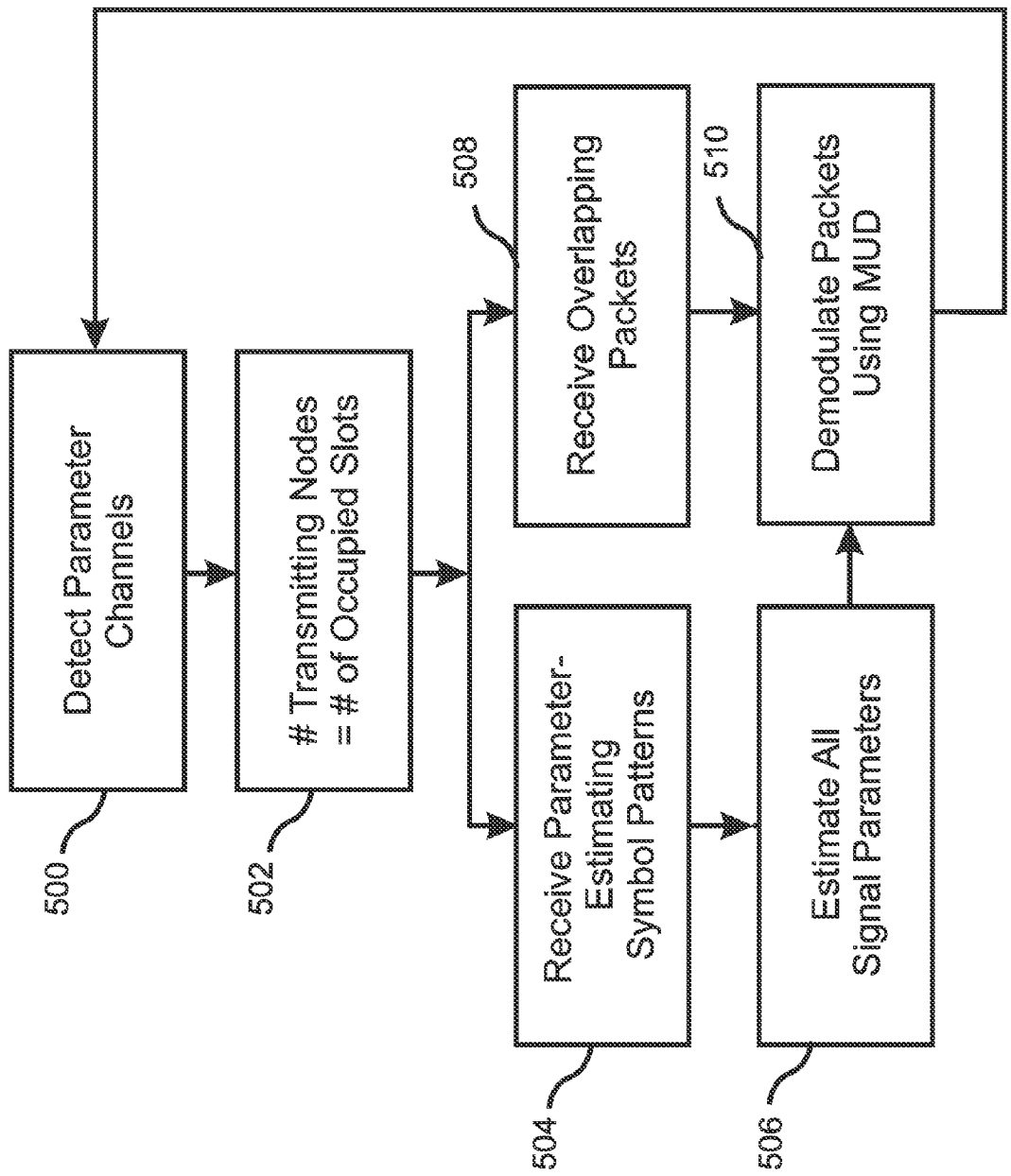
FIG. 5 is a flow diagram illustrating steps followed by a receiving node in the embodiment of FIG. 3.

FIG. 5 is a flow diagram that illustrates the steps followed by a node that is seeking to receive a packet on the network of FIG. 3. The receiving node first acquires and detects all traffic on the parameter channels 500. The number of transmitting nodes can be determined directly from the number of slots that are occupied 502. The signal parameters for each of the transmitting nodes, including amplitude, phase, and relative time delay, can then be estimated 504 from the parameter-estimating symbol patterns transmitted on the parameter channels. In some embodiments other information is transmitted on the parameter channels, such as main channel frequency offset and transmitting node ID. The estimated parameters are then provided to the MUD detector 506, so that the overlapping information packets that are simultaneously received 508 can be demodulated by the MUD detector 510 and individually received.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for enabling a receiving node to distinguish information simultaneously received from a plurality of transmitting nodes on a shared communication channel of a wireless digital network, the method comprising:
   providing a plurality of parameter channels on the network in addition to the shared communication channel;
   requiring each transmitting node to transmit a parameter-estimating signal on an unshared said parameter channel;
   detecting the parameter-estimating signals on the unshared parameter channels and estimating therefrom at least one unique signal parameter for each of the transmitting nodes; and
   detecting and distinguishing the information simultaneously received from each of the transmitting nodes according to their respective said unique estimated signal parameters.

2. The method of claim 1, wherein said providing a plurality of parameter channels comprises using channel-spreading technology.

3. The method of claim 2, wherein said channel spreading technology comprises at least one of FDMA, TDMA, CDMA, and SDMA.

4. The method of claim 1, wherein requiring each transmitting node to transmit a parameter-estimating signal includes requiring each transmitting node to transmit the parameter-estimating signal while simultaneously transmitting information on the shared communication channel.

5. The method of claim 1, wherein the parameter-estimating signal is a parameter-estimating symbol pattern.

6. The method of claim 1, wherein the at least one unique signal parameter comprises signal amplitude.

7. The method of claim 1, wherein the at least one unique signal parameter includes a signal phase.

8. The method of claim 1, wherein the at least one unique signal parameter includes a signal carrier frequency offset.

9. The method of claim 1, wherein the at least one unique signal parameter includes a signal relative time delay.

10. The method of claim 1, further comprising requiring each transmitting node to transmit node identifying information on the unshared parameter channel.

11. The method of claim 1, further comprising requiring each transmitting node to transmit spreading code type information on the unshared parameter channel.

12. The method of claim 1, further comprising requiring each transmitting node to transmit its parameter-estimating signal at an amplitude that is greater than the amplitude at which the transmitting node transmits information on the shared communication channel, the parameter-estimating signal amplitude and the information transmitting amplitude having a predetermined ratio.

13. The method of claim 1, wherein the parameter channels are randomly shifted over time between a plurality of wireless frequencies.

14. The method of claim 13, wherein the parameter channels are shifted according to a random hopping pattern.

15. The method of claim 14, wherein the random hopping pattern is based on a GPS clock timebase.

16. The method of claim 1, wherein the parameter channels are low in communication rate compared to the shared communication channel.

17. A method for enabling a receiving node to distinguish information simultaneously received from a plurality of transmitting nodes on a shared communication channel of a wireless ad-hoc digital network, the method comprising:
   using channel-spreading technology to provide a plurality of parameter channels on the network in addition to the shared communication channel;
   requiring each transmitting node to transmit a parameter-estimating signal on an unshared said parameter channel while simultaneously transmitting information on the shared communication channel;
   detecting the parameter-estimating signals on the unshared parameter channels and estimating therefrom at least a signal amplitude and a signal phase for each of the transmitting nodes; and
   detecting and distinguishing the information simultaneously received from each of the transmitting nodes according to their respective said estimated signal amplitudes and signal phases.

18. The method of claim 17, further comprising requiring each transmitting node to transmit node identifying information on the unshared parameter channel.

19. A method for enabling a receiving node to distinguish a plurality of data packets simultaneously received from a plurality of transmitting nodes on a shared communication channel of a wireless ad-hoc digital network, the method comprising:
   using FDMA channel-spreading technology to divide the shared communication channel into a primary data communication channel and a plurality of parameter channels, the parameter channels being offset in carrier frequency from each other and from the primary data communication channel;
   requiring each transmitting node to transmit a parameter-estimating signal on an unshared said parameter channel while simultaneously transmitting data packets on the shared communication channel;
   detecting the parameter-estimating signals on the unshared parameter channels and estimating therefrom at least a signal amplitude, a signal phase, and a signal carrier offset frequency for each of the transmitting nodes; and
   detecting and distinguishing the plurality of data packets simultaneously received from each of the transmitting nodes according to their respective said estimated signal amplitudes and signal phases.

20. The method of claim 19, further comprising requiring each transmitting node to transmit node identifying information on the unshared parameter channel.

21. A method for enabling a receiving node to distinguish information concurrently received from a plurality of transmitting nodes on a shared communication channel of a wireless digital network, the method comprising:
   receiving a plurality of parameter-estimating signals each on an unshared parameter channel from a corresponding transmitting node;

estimating at least one unique signal parameter for each of the received plurality of parameter-estimating signals; and distinguishing information concurrently received from the transmitting nodes according to their corresponding estimated unique signal parameter.

* * * * *